(12) United States Patent
Zhang et al.

(10) Patent No.: US 10,409,479 B2
(45) Date of Patent: Sep. 10, 2019

(54) DISPLAY CONTROL METHOD AND ELECTRONIC APPARATUS

(71) Applicant: Lenovo (Beijing) Co., Ltd., Beijing (CN)

(72) Inventors: Xiaoping Zhang, Beijing (CN); Zhepeng Wang, Beijing (CN); Xiaobing Guo, Beijing (CN); Qiang Yao, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 347 days.

(21) Appl. No.: 14/641,519

(22) Filed: Mar. 9, 2015

(65) Prior Publication Data

US 2016/0092089 A1 Mar. 31, 2016

(30) Foreign Application Priority Data

Sep. 29, 2014 (CN) .......................... 2014 1 0512931

(51) Int. Cl.
*G06F 3/0484* (2013.01)
*G06F 3/0488* (2013.01)

(52) U.S. Cl.
CPC ........ *G06F 3/04883* (2013.01); *G06F 3/0484* (2013.01); *G06F 2203/04803* (2013.01)

(58) Field of Classification Search
CPC ............... G06F 3/04883; G06F 3/0484; G06F 2203/04803
See application file for complete search history.

(56) References Cited

U.S. PATENT DOCUMENTS

| 2006/0238515 | A1* | 10/2006 | Ohshita | G06F 3/0481 345/173 |
| 2009/0256857 | A1* | 10/2009 | Davidson | G06F 3/0481 345/619 |
| 2010/0088634 | A1* | 4/2010 | Tsuruta | G06F 3/0488 715/800 |
| 2010/0229090 | A1* | 9/2010 | Newton | G06F 3/0428 715/702 |
| 2012/0206363 | A1* | 8/2012 | Kyprianou | G06F 3/04886 345/168 |
| 2015/0199075 | A1* | 7/2015 | Kuscher | G06F 9/4443 715/800 |
| 2015/0365306 | A1* | 12/2015 | Chaudhri | G06F 3/0416 715/736 |

* cited by examiner

*Primary Examiner* — Ryan F Pitaro
*Assistant Examiner* — Parmanand D Patel
(74) *Attorney, Agent, or Firm* — Harness, Dickey & Pierce, P.L.C.

(57) ABSTRACT

A display method and an electronic apparatus are provided. The method includes: displaying a first display page via a display device, where the first display page includes a first region; detecting a first sliding operation and a second sliding operation on the display device with respect to the first display page; determining whether the first sliding operation and the second sliding operation satisfy a set of predetermined conditions; and controlling a display size of the first region according to the first sliding direction or the second sliding direction, if the first sliding operation and the second sliding operation satisfy the set of predetermined conditions.

16 Claims, 11 Drawing Sheets

DISPLAY CONTROL METHOD AND ELECTRONIC APPARATUS

CROSS-REFERENCES TO RELATED APPLICATIONS

The present application claims priority to Chinese Patent Application No. 201410512931.X, filed with the State Intellectual Property Office of People's Republic of China on Sep. 29, 2014 entitled "CONTROL METHOD AND CONTROL APPARATUS", the content of which is incorporated herein by reference in its entirety.

FIELD

The disclosure relates to the field of the electronic technology, and in particular to a display control method and an electronic apparatus.

BACKGROUND

A page displayed by an electronic device generally includes multiple regions; and sizes of the regions may be adjusted to meet different requirement. In the conventional technology, the size of the region is adjusted by selecting and dragging a boundary line of the region, which requires that a user selects the boundary line accurately, otherwise the size of the region can not be adjusted. Hence, in the conventional technology, the operation of adjusting the size of a region is difficult.

SUMMARY

In view of the above content, a display control method and an electronic apparatus are provided According to embodiments of the present disclosure, a display control method is provided, which includes:

displaying a first display page via a display device, where the first display page includes a first region;

detecting a first sliding operation and a second sliding operation on the display device with respect to the first display page;

determining whether the first sliding operation and the second sliding operation satisfy a set of predetermined conditions; and controlling, a display size of the first region according to the first sliding direction or the second sliding direction, if the first sliding operation and the second sliding operation satisfy the set of predetermined conditions.

Optionally, the set of predetermined conditions includes: a first initial operation position of the first sliding operation being located in the first region, a second initial operation position of the second sliding operation being located in a region outside the first region, a first sliding direction of the first sliding operation being the same as a second sliding direction of the second sliding operation, and the first sliding operation and the second sliding operation having an overlapped duration.

Optionally, controlling the size of the first region based on the first sliding direction or the second sliding direction may include:

determining a first boundary in the first region, where the first boundary is located between the first initial operation position and the second initial operation position; and maintaining a second boundary of the first region to be fixed, and controlling the first boundary of the first region to move in the first sliding direction or the second sliding direction, wherein the first boundary is opposite to the second boundary.

Optionally, the first boundary may correspond to an identification region, an area of the first region may be larger than an area of the identification region, and the identification region may include the first boundary; the method further includes:

determining that the first initial operation position is located in the first region and the first sliding operation is performed on the first boundary, if the first initial operation position is located in the identification region.

Optionally, maintaining the second boundary of the first region to be fixed and controlling the first boundary of the first region to move in the first sliding direction or the second sliding direction may include:

controlling the first boundary of the first region to move towards the second boundary to reduce the first region, if the first sliding direction or the second sliding direction points to the second boundary; or controlling the first boundary of the first region to move in a direction deviating from the second boundary to expand the first region, if the first sliding direction or the second sliding direction deviates from the second boundary.

Optionally, the first display page may further include a second region; and where the first initial operation position of the first sliding operation being located in the first region and the second initial operation position of the second sliding operation being located in a region outside the first region in the predetermined condition may include:

the first initial operation position of the first sliding operation being located in the first region and the second initial operation position of the second sliding operation being located in the second region.

Optionally, controlling the size of the first region based on the first sliding direction or the second sliding direction may include:

expanding the first region and reducing the second region, or reducing the first region and expanding the second region, based on the first sliding direction or the second sliding direction.

Optionally, the first region and the second region may be adjacent to each other, and the first boundary of the first region may contact or overlap with a third boundary of the second region, wherein the third boundary of the second region is located between the initial operation position of the first sliding operation and the initial operation position of the second sliding operation; and where maintaining a second boundary of the first region to be fixed and controlling the first boundary of the first region to move in the first sliding direction or the second sliding direction may include:

maintaining the second boundary of the first region and a fourth boundary of the second region to be fixed, wherein the fourth boundary is opposite to the third boundary; and controlling the first boundary of the first region and the third boundary of the second region to move in the first sliding direction or the second sliding direction.

Optionally, the first region and the second region may be located at two sides of a third region respectively, and the first boundary of the first region and the third boundary of the second region each may contact with the third region; and the third boundary of the second region may be located between the first initial operation position and the second initial operation position; and where maintaining the second boundary of the first region to be fixed and controlling the first boundary of the first region to move in the first sliding direction or the second sliding direction may include:

maintaining the second boundary of the first region and a fourth boundary of the second region to be fixed; and controlling the first boundary of the first region and the third boundary of the second region to move in the first sliding direction or the second sliding direction, and maintaining a shape and a size of the third region to be unchanged.

Optionally, controlling the size of the first region based on the first sliding direction or the second sliding direction may include:

determining a first boundary in the first region, where the first boundary is located between the first initial operation position and the second initial operation position;

in the case that the first initial operation position is located in a first sub-region of the first region, expanding the first region if the first sliding direction or the second sliding direction points to the first boundary of the first region; or reducing the first region if the first sliding direction or the second sliding direction deviates from the first boundary of the first region; and in the case that the first initial operation position is located in a second sub-region of the first region, reducing the first region if the first sliding direction or the second sliding direction points to the first boundary of the first region; or expanding the first region if the first sliding direction or the second sliding direction deviates from the first boundary of the first region, where the first sub-region includes the first boundary and the second sub-region includes the second boundary opposite to the first boundary.

According to embodiments of the present disclosure, an electronic apparatus is provided, which includes:

a display module configured to display a first display page, wherein the first display page includes a first region;

a processor configured to:

detect a first sliding operation and a second sliding operation on the display module with respect to the first display page;

determine whether the first sliding operation and the second sliding operation satisfy a set of predetermined conditions; and control a display size of the first region according to the first sliding direction or the second sliding direction, if the first sliding operation and the second sliding operation satisfy the set of predetermined conditions.

Optionally, the set of predetermined conditions includes: a first initial operation position of the first sliding operation being located in the first region, a second initial operation position of the second sliding operation being located in a region outside the first region, a first sliding direction of the first sliding operation being the same as a second sliding direction of the second sliding operation, and the first sliding operation and the second sliding operation having an overlapped duration.

Optionally, the processor is configured to:

determine a first boundary in the first region, where the first boundary is located between the first initial operation position and the second initial operation position; and maintain a second boundary of the first region to be fixed and control the first boundary of the first region to move in the first sliding direction or the second sliding direction, where the first boundary is opposite to the second boundary.

Optionally, the first boundary may correspond to an identification region, an area of the first region may be larger than an area of the identification region, and the identification region may include the first boundary; and where the processor is further configured to determine that the first initial operation position is located in the first region and the first sliding operation is performed on the first boundary, in the case that the first initial operation position is located in the identification region.

Optionally, the processor is configured to:

control the first boundary of the first region to move towards the second boundary to reduce the first region, if the first sliding direction or the second sliding direction points to the second boundary; or control the first boundary of the first region to move towards a direction deviating from the second boundary to expand the first region, if the first sliding direction or the second sliding direction deviates from the second boundary.

Optionally, the first display page may further include a second region; and the first initial operation position of the first sliding operation being located in the first region and the second initial operation position of the second sliding operation being located in a region outside the first region in the predetermined condition may include the first initial operation position of the first sliding operation being located in the first region and the second initial operation position of the second sliding operation being located in the second region.

Optionally, the processor is configured to expand the first region and reduce the second region, or reduce the first region and expand the second region based on the first sliding direction or the second sliding direction.

Optionally, the first region and the second region may be adjacent to each other, and the first boundary of the first region may contact or overlap with a third boundary of the second region, where the third boundary of the second region is located between the initial operation position of the first sliding operation and the initial operation position of the second sliding operation; and where the processor is configured to:

maintain the second boundary of the first region and a fourth boundary of the second region to be fixed, where the fourth boundary is opposite to the third boundary; and control the first boundary of the first region and the third boundary of the second region to move in the first sliding direction or the second sliding direction.

Optionally, the first region and the second region may be located at two sides of a third region respectively, and the first boundary of the first region and the third boundary of the second region each may contact with the third region; and the third boundary of the second region may be located between the first initial operation position and the second initial operation position; and where the processor is configured to:

maintain the second boundary of the first region and a fourth boundary of the second region to be fixed; and control the first boundary of the first region and the third boundary of the second region to move in the first sliding direction or the second sliding direction, and maintain a shape and a size of the third region to be unchanged.

Optionally, the processor is configured to:

determine a first boundary in the first region, where the first boundary is located between the first initial operation position and the second initial operation position;

in the case that the first initial operation position is located in a first sub-region of the first region, expand the first region if the first sliding direction or the second sliding direction points to the first boundary of the first region; or reduce the first region if the first sliding direction or the second sliding direction deviates from the first boundary of the first region; and in the case that the first initial operation position is located in a second sub-region of the first region, reduce the first region if the first sliding direction or the second sliding direction points to the first boundary of the first region; or expand the first region if the first sliding direction or the second sliding direction deviates from the first boundary of the first region, where the first sub-region includes the first boundary and the second sub-region includes the second boundary opposite to the first boundary.

BRIEF DESCRIPTION OF THE DRAWINGS

In order to illustrate the technical solutions in the embodiments of the disclosure or the conventional technology more clearly, hereinafter the drawings for the description of the embodiments or the conventional technology will be introduced simply. Apparently, the drawings described below are only the embodiments of the disclosure, and other drawings may be obtained based on the provided drawings by those skilled in the art without any creative work.

DETAILED DESCRIPTION

The technical solutions of the embodiments of the disclosure will be described clearly and completely in conjunction with the drawings of the embodiments of the disclosure hereinafter. Apparently, the described embodiments are only a few of the embodiments of the disclosure, but not all the embodiments. All of other embodiments obtained based on the embodiments of the disclosure by those skilled in the art without any creative work fall within the scope of protection of the disclosure.

According to an embodiment of the present disclosure, it is provided a display method, which includes: detecting a first sliding operation and a second sliding operation in displaying a first display page; determining whether the first sliding operation and the second sliding operation meet a predetermined condition that: a first initial operation position of the first sliding operation is located in the first region, a second initial operation position of the second sliding operation is located in a region other than the first region, a first sliding direction of the first sliding operation is the same as a second sliding direction of the second sliding operation, and a first sliding process of the first sliding operation and a second sliding process of the second sliding operation have overlapped time duration; and controlling, from a starting time instant of the overlapped time duration, a size of the first region based on the first sliding direction or the second sliding direction, in the case that the first sliding operation and the second sliding operation meet the predetermined condition. Therefore, the size of the first region is controlled by performing two sliding operations with the same sliding direction, it does not need to adjust the size of the first region by touching the boundary of the first region, thereby the operation is simple and accurate.

The technical solutions of the embodiments of the disclosure will be described in detail in conjunction with the drawings hereinafter.

Figure 1:
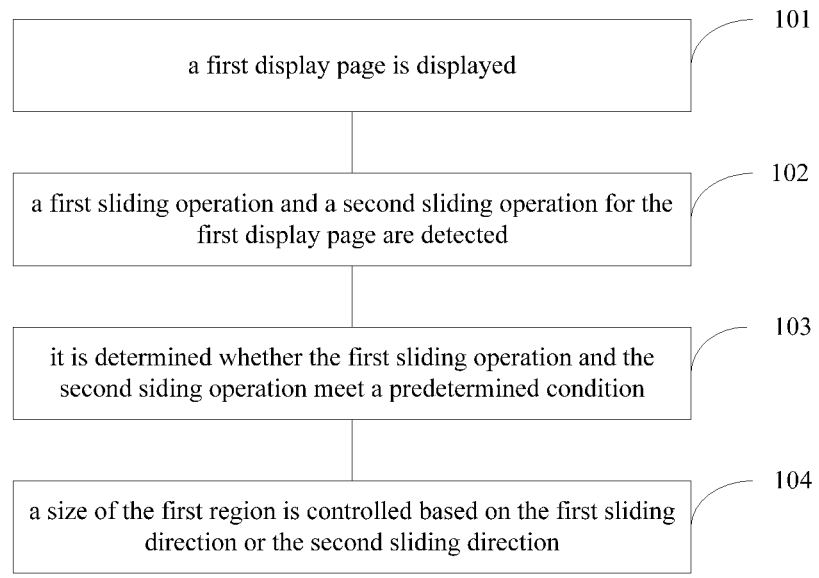
FIG. 1 is a flowchart of a display method according to an embodiment of the disclosure.

FIG. 1 is a flowchart of a display method according to an embodiment of the disclosure.

The technical solutions of the disclosure may be applied to an electronic device which can display a page, for example a portable device and a hand-held terminal. The electronic device includes a touch sensing unit via which different display pages are displayed. The touch sensing unit can detect a touch operation.

The method may include step 101 to step 104.

In step 101, a first display page is displayed, where the first display page includes a first region.

In step 102, a first sliding operation and a second sliding operation for the first display page are detected. The sliding operations may be continuous touch operations performed in a touch screen.

In step 103, it is determined whether the first sliding operation and the second siding operation meet a predetermined condition that: a first initial operation position of the first sliding operation is located in the first region, a second initial operation position of the second sliding operation is located in a region other than the first region, a first sliding direction of the first sliding operation is the same as a second sliding direction of the second sliding operation, and a first sliding process of the first sliding operation and a second sliding process of the second sliding operation have overlapped time duration.

In step 104, from a starting time instant of the overlapped time duration, a size of the first region is controlled based on the first sliding direction or the second sliding direction, in the case that the first sliding operation and the second sliding operation meet the predetermined condition.

In the case that the first sliding operation and the second sliding operation meet the predetermined condition, it is indicated that the first sliding operation and the second sliding operation are performed on the first display page simultaneously. In this case, since the first sliding direction is the same as the second sliding direction, the size of the first region is controlled to adjust the size of the first region based on the first sliding direction or the second siding direction, from the starting time instant of the overlapped time duration.

In the conventional technology, it is difficult to accurately detect a position at which a touch operation is performed by a touch sensing unit of the electronic device, hence it is difficult to adjust the size of a region by accurately touching the boundary of the region boundary. However, in the embodiment, for the first region of the first display page, the size of the first region may be controlled by performing two sliding operations with the same sliding direction, hence it does not need to adjust the size of the first region by touching the boundary of the first region, thereby the operation is simple and accurate.

The first initial operation position of the first sliding operation and the second initial operation position of the second sliding operation may refer to touch positions where the first sliding operation and the second sliding operation are performed respectively, at the starting time instant of the overlapped time duration.

Practically, the first initial position may also refer to a touch position where the first sliding operation is performed at an initial time instant of the first sliding operation, and the second initial position may also refer to a touch position where the second sliding operation is performed at an initial time instant of the second sliding operation.

As another example, in an embodiment of the disclosure, the controlling, from a starting time instant of the overlapped time duration, the size of the first region based on the first sliding direction or the second sliding direction may include:

determining a first boundary in the first region which is located between the first initial operation position and the second initial operation position, from the starting time instant of the overlapped time instant; and maintaining a second boundary of the first region to be fixed and controlling the first boundary of the first region to move in the first sliding direction or the second sliding direction, where the first boundary is opposite to the second boundary.

Figure 2A:
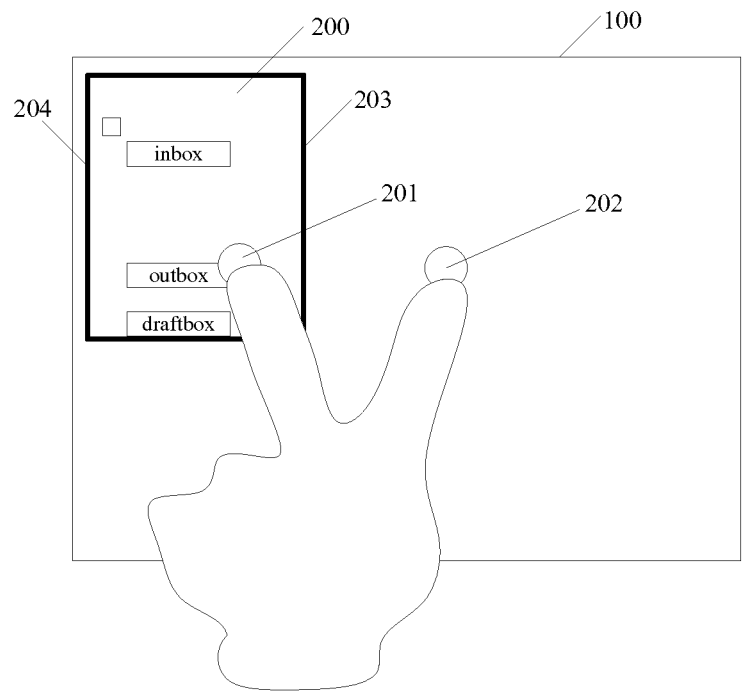
FIG. 2a to FIG. 2g, FIG. 3a to FIG. 3h and FIG. 4a to FIG. 4d are schematic diagrams of different operations for controlling a size of a region according to an embodiment of the disclosure.
Figure 2B:
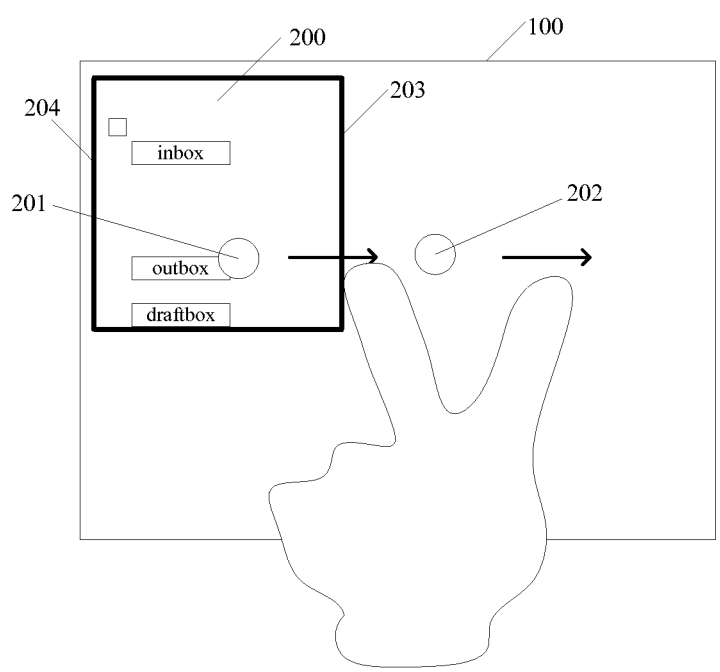
Figure 2C:
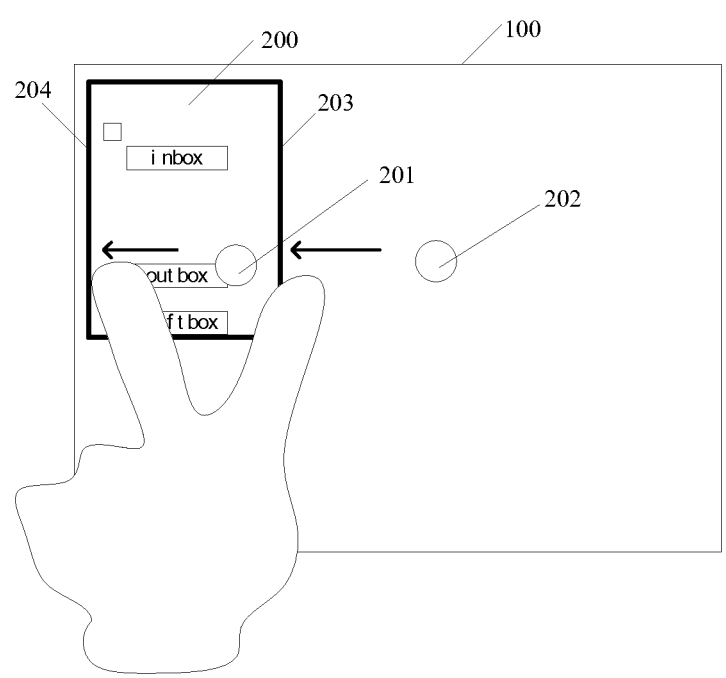

FIG. 2a to FIG. 2c show schematic diagrams of operations for controlling the size of the first region of the first display page according to an embodiment of the disclosure.

It is assumed that two sliding operations are respectively performed via touching by two fingers of a user.

The first initial operation position 201 is located in the first region 200 of the first display page 100, and the second initial operation position 202 is located in the region outside the first region 200 of the first display page 100.

The first boundary 203 is located between the first initial operation position 201 and the second initial operation position 202.

The first sliding operation is performed in a first sliding direction, the second sliding operation is performed in a second sliding direction, and the first sliding direction is the same as the second sliding direction. FIG. 2b and FIG. 2c respectively show two different sliding directions as shown by arrows.

The size of the first region is controlled by the following way that: the second boundary 204 of the first region 200 is maintained to be fixed, and the first boundary 203 of the first region is controlled to move in the first sliding direction or the second sliding direction. The first boundary 203 is opposite to the second boundary 204, and specifically the first boundary 203 may be parallel with the second boundary 204.

As shown in FIG. 2b and FIG. 2c, the first region is expanded in the case that the first boundary moves in the sliding direction shown as FIG. 2b, and the first region is reduced in the case that the first boundary moves in a sliding direction shown as FIG. 2c.

The first boundary may be translated, i.e., the first boundary may be translated in the case that the sliding direction is not perpendicular to the first boundary. Hence, maintaining the second boundary of the first region to be fixed and controlling the first boundary of the first region to move in the first sliding direction or the second sliding direction may include:

maintaining the second boundary of the first region to be fixed;

controlling the first boundary of the first region to move towards the second boundary to reduce the first region, in the case that the first sliding direction or the second sliding direction points to the second boundary; or controlling the first boundary of the first region to move towards a direction deviating from the second boundary to expand the first region, in the case that the first sliding direction or the second sliding direction deviates from the second boundary.

It should be noted that, the first sliding direction or the second sliding direction points to the second boundary, which indicates that the first sliding direction or the second sliding direction deviates from the first boundary. The first sliding direction or the second sliding direction deviates from the second boundary, which indicates that the first sliding direction or the second sliding direction points to the first boundary. The method in which the first boundary acts as a standard boundary also falls within the scope of protection of the disclosure.

In FIG. 2b, the sliding direction deviates from the second boundary 204. In FIG. 2c, the sliding direction points to the second boundary 204.

Figure 2D:
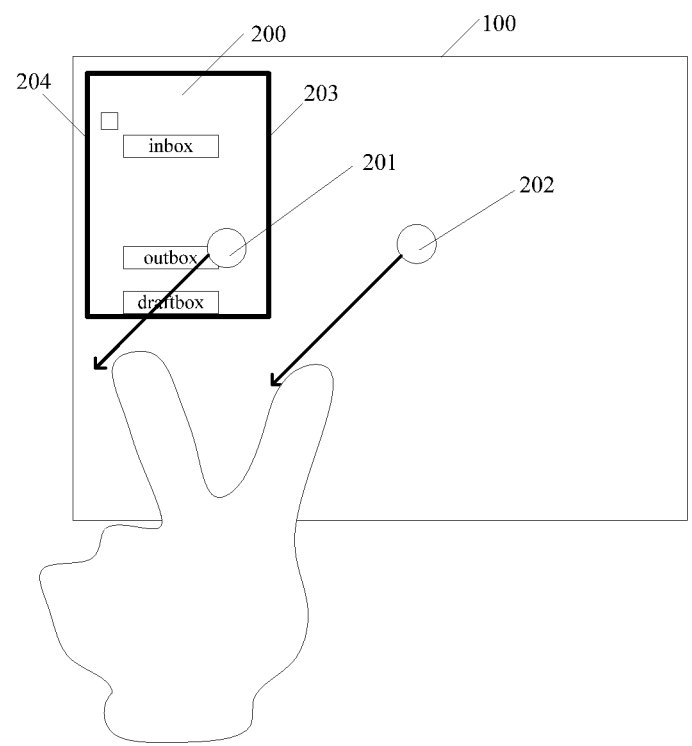
Figure 2E:
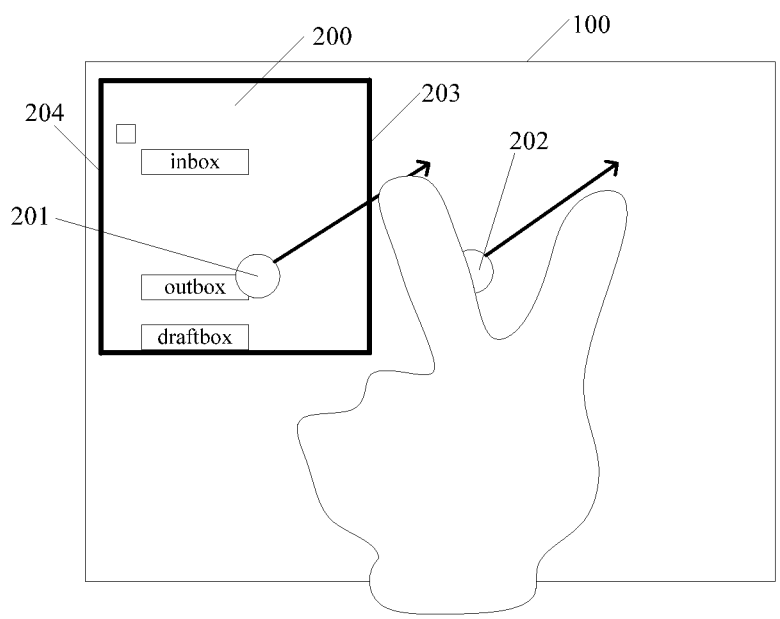

As shown in FIG. 2d and FIG. 2e, the first boundary is opposite to and parallel with the second boundary. The sliding direction shown in FIG. 2d points to the second boundary 204 and is not perpendicular to the second boundary, in this case the first boundary is controlled to move parallel towards the second boundary. The sliding direction shown in FIG. 2e deviates from the second boundary 204 and is not perpendicular to the second boundary, in this case the first boundary is controlled to move parallel in the direction deviating from the second boundary.

As another example, in an embodiment of the disclosure, the first boundary may correspond to an identification region. The area of the first region is larger than the area of the identification region, and the identification region includes the first boundary.

It is determined that the first initial operation position is located in the first region, and the first sliding operation is performed on the first boundary, in the case that the first initial operation position is located in the identification region.

Hence, in process of adjusting the size of the first region by performing the first sliding operation and the second sliding operation, it may be considered that the first initial operation is performed on the first boundary if the first initial operation position of the first sliding operation is located in the identification region.

Hence, in the embodiment of the disclosure, the method may further include:

maintaining the second boundary of the first region to be fixed and controlling the first boundary to move in the first sliding direction of the first sliding operation, in the case that the first initial operation position is located in the identification region.

Hence, as long as the initial operation position is located in the identification region, rather than on the boundary of the first region, it may be considered that the sliding operation is performed on the boundary, thereby the operation is simple and an accurate adjustment may be performed.

Figure 2F:
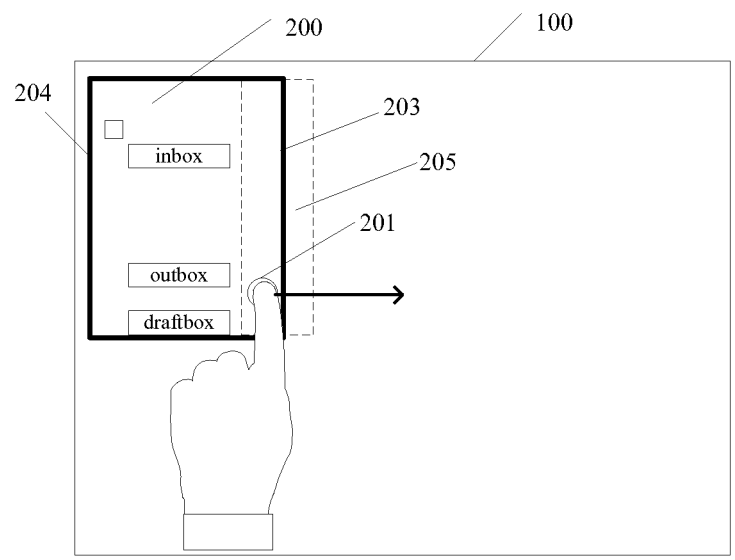
Figure 2G:
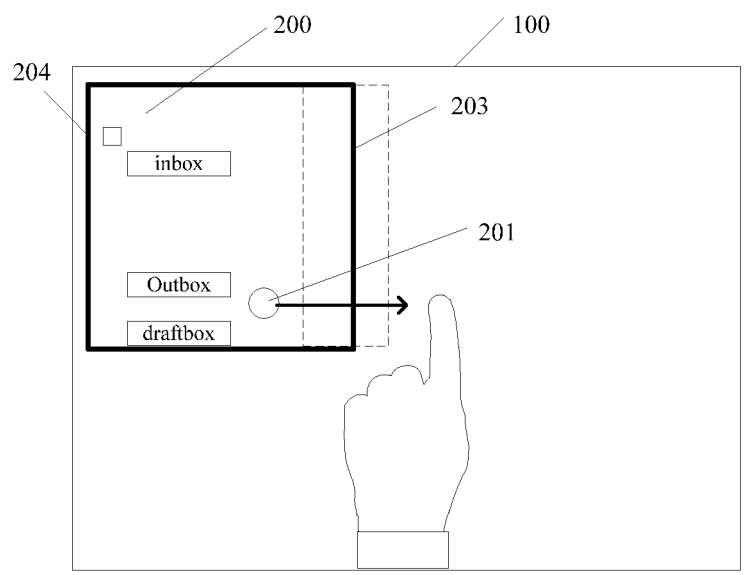

As shown in FIG. 2f and FIG. 2g, the first initial operation position 201 of the first sliding operation is located in the identification region 205, which is shown by a dashed box in the figures and may include the first boundary 203.

The second boundary 204 of the first region 200 may be maintained to be fixed, and the first boundary 203 is controlled to move in the first sliding direction based on the sliding direction shown in the figures.

As another embodiment, the first display page in the embodiment of the disclosure may further include a second region.

In this case, the first initial operation position of the first sliding operation being located in the first region and the second initial operation position of the second sliding operation being located in a region other than the first region in the predetermined condition may include:

the first initial operation position of the first sliding operation being located in the first region, and the second initial operation position of the second sliding operation being located in the second region.

As a possible implementing way, the first region and the second region are adjacent to each other, and the first boundary of the first region contacts or overlaps with a third boundary of the second region.

Figure 3A:
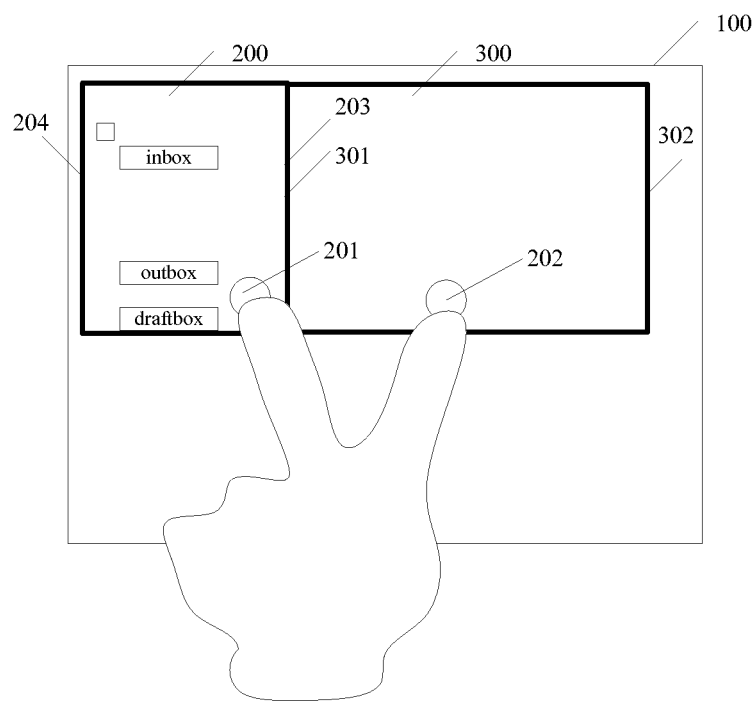

As shown in FIG. 3a, in the first display region 100, the first initial operation position 201 is located in the first region 200, the second initial operation position 202 is located in the second region 300, and the first region 200 and the second region 300 are adjacent to each other. In FIG. 3a, the first boundary 203 of the first region 200 overlaps with the third boundary 301 of the second region 300.

As another possible implementing way, the first region may be separated from the second region via a third region. The first region and the second region are respectively located at two sides of the third region, and the first boundary of the first region and the third boundary of the second region each contact with the third region.

Figure 3B:
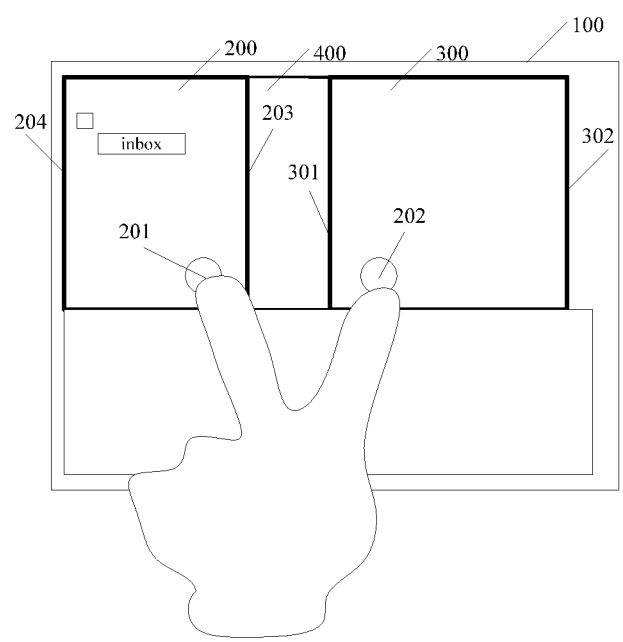

As shown in FIG. 3b, in the first display page 100, the first initial operation position 201 is located in the first region 200, the second initial operation position 202 is located in the second region 300, the first region 200 is separated from the second region 300 via the third region 400, and the first boundary 203 of the first region 200 and the third boundary 301 of the second region each contact with the third region 400.

In the case that the first display page includes the second region and the second initial operation position is located in the second region, controlling the size of the first region based on the first sliding direction or the second siding direction may include:

expanding the first region and reducing the second region, or reducing the first region and expanding the second region, based on the first sliding direction or the second sliding direction.

In the case that the first region and the second region are adjacent to each other, controlling the size of the first region based on the first sliding direction or the second siding direction may include:

maintaining the second boundary of the first region and a fourth boundary of the second region to be fixed, where the fourth boundary is opposite to the third boundary, and specifically the fourth boundary may be parallel with the third boundary;

controlling the first boundary of the first region and the third boundary of the second region to move in the first sliding direction or the second sliding direction;

controlling the first boundary of the first region and the third boundary of the second region to move towards the second boundary to reduce the first region and expand the second region, in the case that the first sliding direction or the second sliding direction points to the second boundary; or controlling the first boundary of the first region and the third boundary of the second region to move in a direction deviating from the second boundary to expand the first region and reduce the second region, in the case that the first sliding direction or the second sliding direction deviates from the second boundary.

Figure 3C:
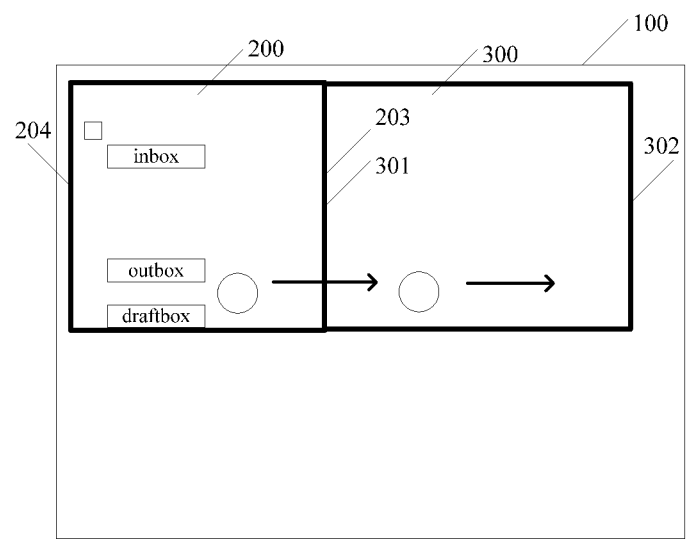
Figure 3D:
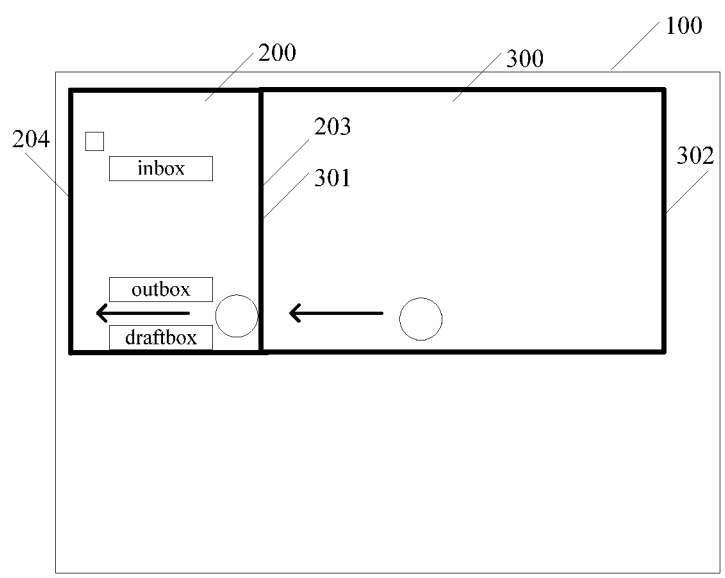

As shown in FIG. 3c and FIG. 3d, the second boundary 204 of the first region 200 and the fourth boundary 302 of the second region 300 are maintained to be fixed, and the first boundary 203 and the third boundary 301 are controlled to move in the sliding direction shown in FIG. 3c or FIG. 3d.

In FIG. 3c, the first region is expanded and the second region is reduced. In FIG. 3d, the first region is reduced, and the second region is expanded.

In the case that the first region and the second region are respectively located at two sides of the third region, controlling the size of the first region based on the first sliding direction or the second siding direction may include:

maintaining the second boundary of the first region and the fourth boundary of the second region to be fixed; and controlling the first boundary of the first region and the third boundary of the second region to move in the first sliding direction or the second sliding direction, and maintaining a shape and a size of the third region to be unchanged.

That is to say, in the process of performing the first sliding operation and the second sliding operation, the sizes of the first region and the second region change, but the size and shape of the third region do not change and only a position of the third region changes.

Figure 3E:
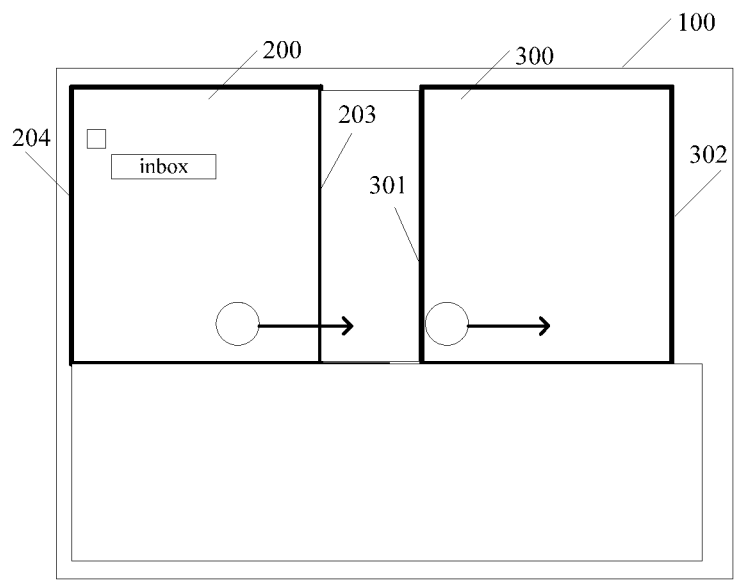
Figure 3F:
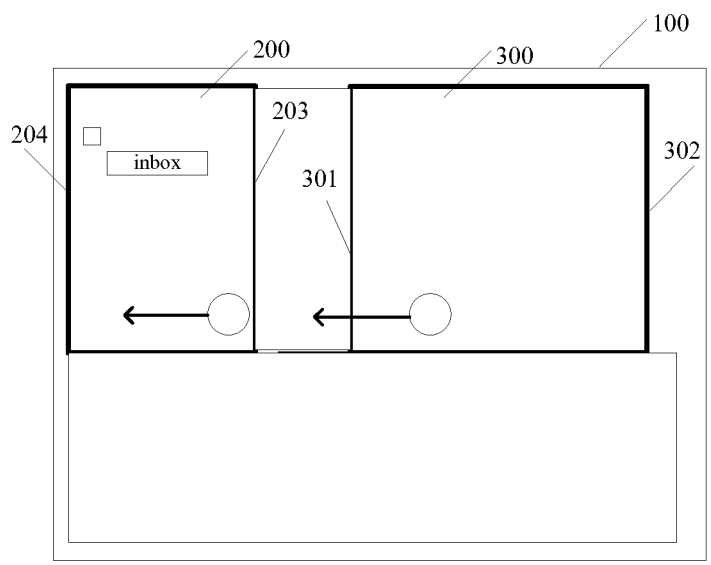

As shown in FIG. 3e and FIG. 3f, the second boundary 204 of the first region 200 and the fourth boundary 302 of the second region 300 are maintained to be fixed, and the first boundary 204 and the third boundary 301 are controlled to move in the sliding direction shown in FIG. 3e or FIG. 3f. The shape and the size of the third region do not change, and the third region move parallel in the sliding direction.

Practically, as another embodiment, in the case that the first display page includes the second region, and the second initial operation position is located in the second region, controlling the size of the first region based on the first sliding direction or the second sliding direction may include:

simultaneously expanding the first region and the second region, or simultaneously reducing the first region and the second region based on the first sliding direction or the second sliding direction.

In this case, the first sliding direction or the second sliding direction may be parallel with the first boundary.

Figure 3G:
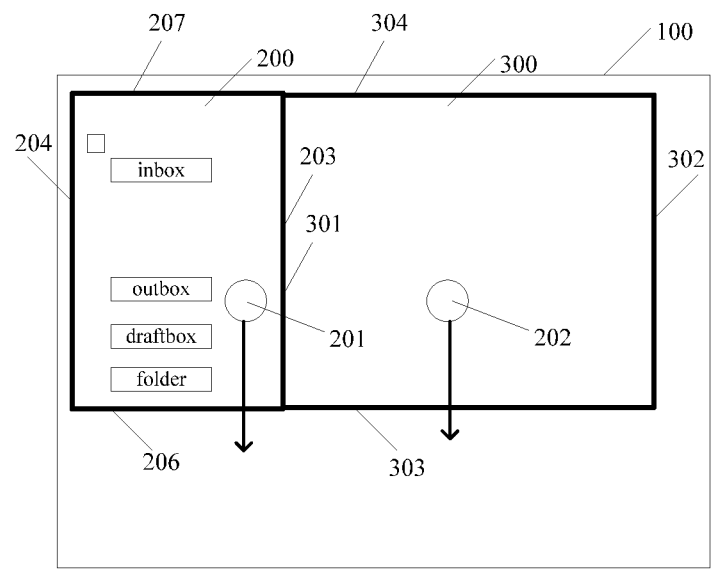
Figure 3H:
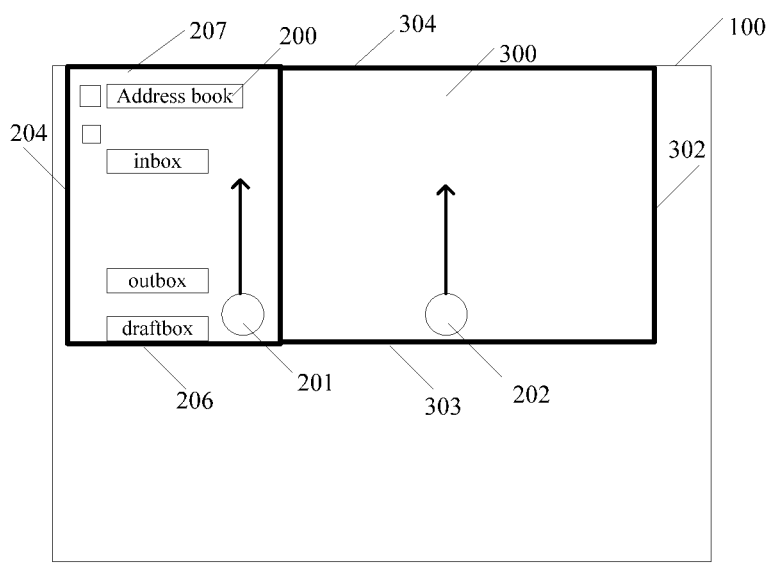

As shown in FIG. 3g and FIG. 3h, a fifth boundary 206 of the first region 200 and a sixth boundary 303 of the second region 300 are maintained to be fixed, and a seventh boundary 207 of the first region and an eighth boundary 304 of the second region are controlled to move in the sliding direction shown in FIG. 3g or FIG. 3h.

In FIG. 3g, the first region and the second region are reduced simultaneously. In FIG. 3h, the first region and the second region are expanded simultaneously.

As another example, in an embodiment of the disclosure, controlling the size of the first region based on the first sliding direction or the second sliding direction may include:

determining the first boundary in the first region, where the first boundary is located between the first initial operation position and the second initial operation position;

based on the first sliding direction or the second sliding direction and in the case that the first initial operation position is located in a first sub-region of the first region, expanding the first region if the first sliding direction or the second sliding direction points to the first boundary of the first region; or reducing the first region if the first sliding direction or the second sliding direction deviates from the first boundary of the first region; and in the case that the first initial operation position is located in a second sub-region of the first region, reducing the first region if the first sliding direction or the second sliding direction points to the first boundary of the first region; or expanding the first region if the first sliding direction or the second sliding direction deviates from the first boundary of the first region, where the first sub-region includes the first boundary and the second sub-region includes the second boundary opposite to the first boundary.

In a possible implementing way, the first region may be divided into a first sub-region and a second sub-region, and specifically the first region may be divided through a center line parallel with the first boundary and the second boundary. The first sub-region includes the first boundary of the first region, and the second sub-region includes the second boundary of the first region.

Figure 4A:
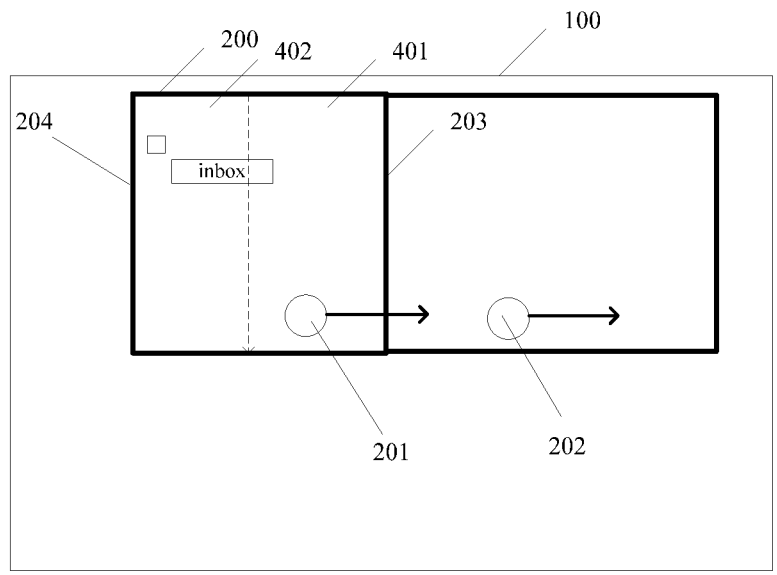
Figure 4B:
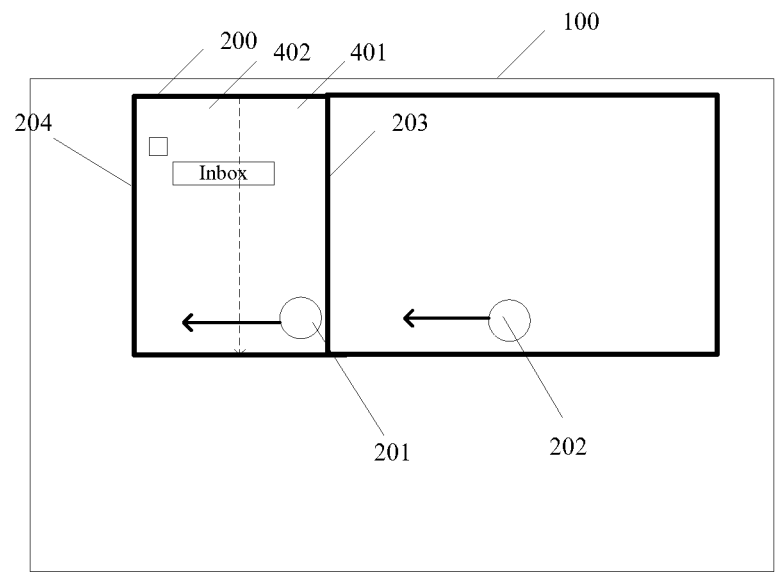

As shown in FIG. 4a and FIG. 4b, in the first display page 100, the first region 200 is divided into the first sub-region 401 and the second sub-region 402 by taking a dashed line in the figures as a dividing line. The first sub-region 401 includes the first boundary 203, and the second sub-region 402 includes the second boundary 204.

In the case that the first initial operation position 201 is located in the first sub-region, the first boundary is controlled to move in the sliding direction shown in FIG. 4a to expand the first region 200, where the sliding direction points to the first boundary 203.

Alternatively, the first boundary is controlled to move in the sliding direction shown in FIG. 4b to reduce the first region 200, where the sliding direction deviates from the first boundary 203.

Figure 4C:
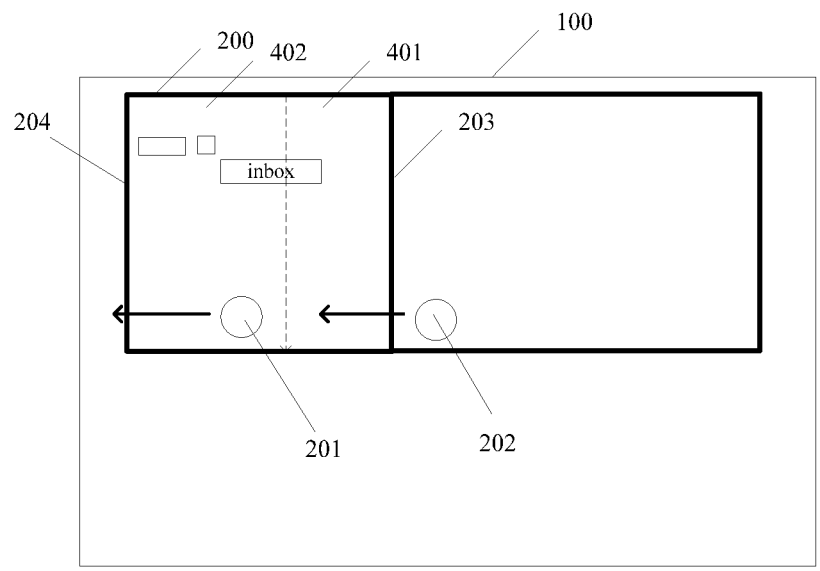
Figure 4D:
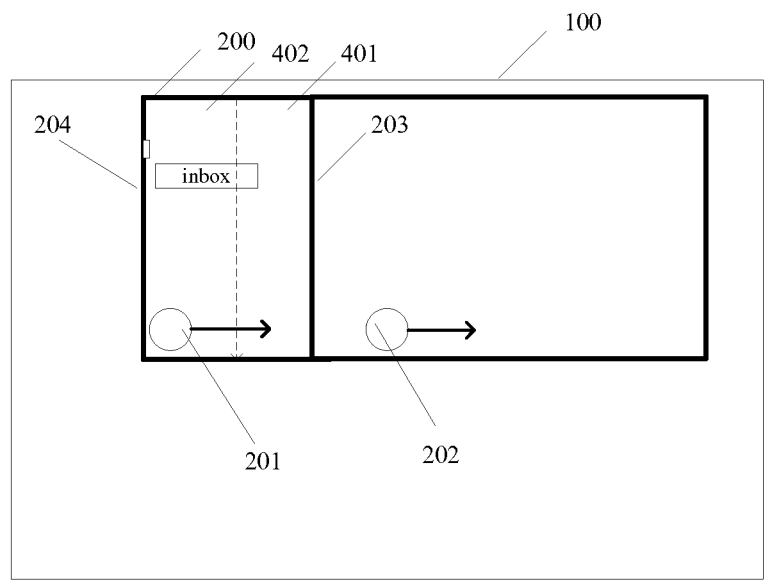

As shown in FIG. 4c and FIG. 4d, in the first display page 100, the first region 200 is divided into the first sub-region 401 and the second sub-region 402 by taking a dashed line in the figures as a dividing line. The first sub-region 401 includes the first boundary 203, and the second sub-region 402 includes the second boundary 204.

In the case that the first initial operation position 201 is located in the second sub-region, the second boundary 204 is controlled to move in the sliding direction shown in FIG. 4c to expand the first region 200, where the sliding direction deviates from the first boundary 203.

Alternatively, the second boundary 204 is controlled to move in the sliding direction shown in FIG. 4d to reduce the first region 200, where the sliding direction points to the first boundary 203.

For various method embodiments described above, the method is performed by a combination of a series of actions for simplifying the description, however, those skilled in the art should know that the disclosure is not limited by the order of actions described above, since some steps may be performed with other orders or simultaneously based on the disclosure. In addition, those skilled in the art should know that the embodiments described in the specification each are preferred embodiments, and the related actions and modules may not be necessary for the disclosure.

Figure 5:
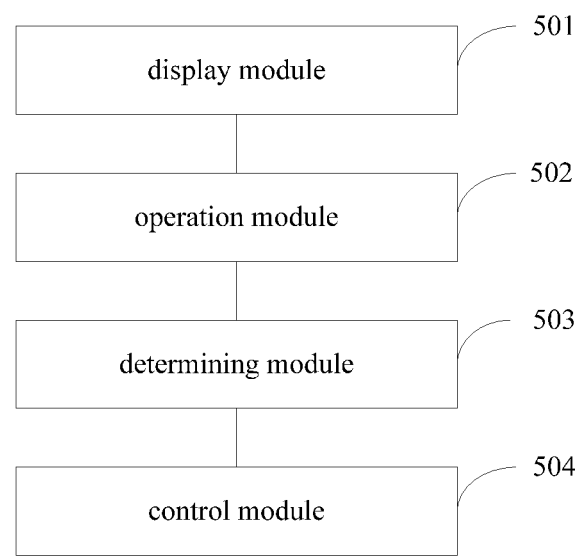
FIG. 5 is a schematic structural diagram of an electronic apparatus according to an embodiment of the disclosure.

FIG. 5 is a schematic structural diagram of a control apparatus according to an embodiment of the disclosure.

The apparatus may be applied to an electronic device. The apparatus may be integrated into a processor of the electronic device to implement a function of the processor, or may be an independent module connected to the processor.

The electronic device may be a portable device or a hand-held terminal or the like. A display screen of the electronic device may be a touch screen which can detect an operation of closing to or contacting the touch screen.

The apparatus may include a display module 501, an operation detecting module 502, a determining module 503 and a control module 504. The operation detecting module 502, the determining module 503 and the control module 504 may constitute a processor of said apparatus.

The display module 501 is configured to display a first display page, where the first display page includes a first region.

The operation detecting module 502 is configured to detect a first sliding operation and a second sliding operation for the first display page.

The determining module 503 is configured to determine whether the first sliding operation and the second sliding operation meet a predetermined condition that: a first initial operation position of the first sliding operation is located in the first region, a second initial operation position of the second sliding operation is located in a region other than the first region, a first sliding direction of the first sliding operation is the same as a second sliding direction of the second sliding operation, and a first sliding process of the first sliding operation and a second sliding process of the second sliding operation have overlapped time duration.

The control module 504 is configured to control, from a starting time instant of the overlapped time duration, a size of the first region based on the first sliding direction or the second sliding direction, in the case that the determining module determines that the first sliding operation and the second sliding operation meet the predetermined condition.

In the embodiment, for the first region of the first display page, the size of the first region may be controlled by performing two sliding operations with the same sliding direction, hence it does not need to adjust the size of the first region by touching a boundary of the first region, thereby the operation is simple and accurate.

The first initial operation position of the first sliding operation and the second initial operation position of the second sliding operation may refer to touch positions where the first sliding operation and the second sliding operation are performed respectively, at the starting time instant of the overlapped time duration.

Practically, the first initial position may also refer to a touch position where the first sliding operation is performed at an initial time instant of the first sliding operation, and the second initial position may refer to a touch position where the second sliding operation is performed at an initial time instant of the second sliding operation.

As another example, in an embodiment of the disclosure, the control module may be configured to:

determine a first boundary in the first region which is located between the first initial operation position and the second initial operation position, from the starting time instant of the overlapped time duration; and maintain a second boundary of the first region to be fixed, and control the first boundary of the first region to move in the first sliding direction or the second sliding direction, where the first boundary is opposite to the second boundary.

For the specific description, one may refer to FIG. 2a to FIG. 2c.

The first boundary may be translated, i.e., the first boundary may be translated in the case that the sliding direction is not perpendicular to the first boundary. Hence, the control module is configured to:

maintain the second boundary of the first region to be fixed;

control the first boundary of the first region to move towards the second boundary to reduce the first region, in the case that the first sliding direction or the second sliding direction points to the second boundary; or control the first boundary of the first region to move in a direction deviating from the second boundary to expand the first region, in the case that the first sliding direction or the second sliding direction deviates from the second boundary.

It should be noted that, the first sliding direction or the second siding direction points to the second boundary, which indicates that the first sliding direction or the second sliding direction deviates from the first boundary. The first sliding direction or the second sliding direction deviates from the second boundary, which indicates that the first sliding direction or the second sliding direction points to the first boundary.

For the specific description, one may refer to FIG. 2b and FIG. 2e.

As another example, in an embodiment of the disclosure, the first boundary may correspond to an identification region. The area of the first region is larger than the area of the identification region, and the identification region includes the first boundary.

It is determined that the first initial operation position is located in the first region and the first sliding operation is performed on the first boundary, in the case that the first initial operation position is located in the identification region.

Hence, in process of adjusting the size of the first region by performing the first sliding operation and the second sliding operation, it may be considered the first initial operation is performed on the first boundary if the first initial operation position of the first sliding operation is located in the identification region.

Hence, in the embodiment of the disclosure, the control module may be further configured to:

maintain the second boundary of the first region to be fixed and control the first boundary to move in the first sliding direction of the first sliding operation, in the case that the first initial operation position is located in the identification region.

For the specific description, one may refer to FIG. 2f.

As another example, the first display page in the embodiment of the disclosure may further include a second region.

In this case, the first initial operation position of the first sliding operation being located in the first region and the second initial operation position of the second sliding operation being located in a region other than the first region may include:

the first initial operation position of the first sliding operation being located in the first region and the second initial operation position of the second sliding operation being located in the second region.

The control module may be configured to:

expand the first region and reduce the second region, or reduce the first region and expand the second region based on the first sliding direction or the second sliding direction.

As a possible implementing way, the first region and the second region are adjacent to each other, and the first boundary of the first region contacts or overlaps with the third boundary of the second region, as shown in FIG. 3a.

As another possible implementing way, the first region may be separated from the second region via a third region. The first region and the second region are respectively located at two sides of the third region, and the first boundary of the first region and the third boundary of the second region each contact with the third region, as shown in FIG. 3b.

In the case that the first display page includes the second region, and the second initial operation position is located in the second region, the control module may be configured to:

maintain the second boundary of the first region and a fourth boundary of the second region to be fixed, where the fourth boundary is opposite to the third boundary;

control the first boundary of the first region and the third boundary of the second region to move in the first sliding direction or the second sliding direction;

control the first boundary of the first region and the third boundary of the second region to move towards the second boundary to reduce the first region and expand the second region, in the case that the first sliding direction or the second sliding direction points to the second boundary; or control the first boundary of the first region and the third boundary of the second region to move in a direction deviating from the second boundary to expand the first region and reduce the second region, in the case that the first sliding direction or the second sliding direction deviates from the second boundary.

For the specific description, one may refer to FIG. 3c and FIG. 3d.

In the case that the first region and the second region are respectively located at two sides of the third region, the control module may be configured to:

maintain the second boundary of the first region and the fourth boundary of the second region to be fixed; and control the first boundary of the first region and the third boundary of the second region to move in the first sliding direction or the second sliding direction, and maintain a shape and a size of the third region to be unchanged.

That is to say, in process of performing the first sliding operation and the second sliding operation, the sizes of the first region and the second region change, but the size and shape of the third region do not change and only a position of the third region changes.

For the specific description, one may refer to FIG. 3e and FIG. 3f.

As another example, in an embodiment of the disclosure, the control module may be configured to:

determine the first boundary in the first region, where the first boundary is located between the first initial operation position and the second initial operation position;

based on the first sliding direction or the second sliding direction and in the case that the first initial operation position is located in a first sub-region of the first region, expand the first region if the first sliding direction or the second sliding direction points to the first boundary of the first region; or reduce the first region if the first sliding direction or the second sliding direction deviates from the first boundary of the first region; and in the case that the first initial operation position is located in a second sub-region of the first region, reduce the first region if the first sliding direction or the second sliding direction points to the first boundary of the first region; or expand the first region if the first sliding direction or the second sliding direction deviates from the first boundary of the first region, where the first sub-region includes the first boundary, and the second sub-region includes the second boundary opposite to the first boundary.

In a possible implementing way, the first region may be divided into the first sub-region and the second sub-region, and specifically the first region may be divided through a center line parallel with the first boundary and the second boundary. The first sub-region includes the first boundary of the first region, and the second sub-region includes the second boundary of the first region.

For the specific description, one may refer to FIG. 4a to FIG. 4d.

According to various embodiments described above, the size of the region of the display page can be adjusted without accurately performing sliding operation on the boundary of the region, and the operation is simple, accurate and convenient, thereby efficiently adjusting the size of the region and improving a user experience.

Various embodiments of the specification are described in a progressive way, each embodiment lays emphasis on the difference from other embodiments, and for the same or similar parts between various embodiments, one may refer to the description of other embodiments. For the apparatus disclosed by the embodiments, since it corresponds to the method disclosed by the embodiments, the description of the apparatus is simple; and for the parts related to the method, one may refer to the description of the method embodiments.

It should be noted that the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a plurality of elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

For simplifying the description, the apparatus is described by various units based on specific functions. Practically, in case of implementing the disclosure, functions of various units may be implemented in one or more software and/or hardware.

According to the embodiments described above, those skilled in the art may clearly know that the disclosure may be implemented by means of software in conjunction with a necessary general-purpose hardware platform. Based on such understanding, essential parts or parts contributing to the conventional technology of the technical solutions of the disclosure may be embodied as a software product. The software production may be stored in a storage medium for example a ROM/RAM, a disc or a compact disc, and include several instructions configured to control a computer device (which may be a personal computer, a server or a network device) to perform the method described in various embodiments of the disclosure or certain parts of the embodiments.

The above illustration of the disclosed embodiments enables those skilled in the art to implement or use the disclosure. Many changes to theses embodiments are apparent for those skilled in the art, and general principles defined herein may be implemented in other embodiments without departing from the spirit or scope of the disclosure. Hence, the disclosure is not limited by the disclosed embodiments, but is to conform to the widest scope in consistent with principles and novel features disclosed herein.

The invention claimed is:

1. A display control method, comprising:
   displaying a first display page via a display device, wherein the first display page comprises a first region and a second region, and an area of the first display page is less than a display area of the display device;
   detecting a first sliding operation and a second sliding operation on the display device with respect to the first display page, wherein the first sliding operation and the second sliding operation are performed simultaneously;
   determining whether the first sliding operation and the second sliding operation satisfy a set of predetermined conditions, wherein the set of predetermined conditions include a first initial operation position of the first sliding operation being located in the first region, a second initial operation position of the second sliding operation being located in the second region;
   controlling a display size of the first region according to a first sliding direction or a second sliding direction when the first sliding operation and the second sliding operation satisfy the set of predetermined conditions; and
   wherein controlling the display size of the first region according to the first sliding direction or the second sliding direction comprises:
   determining a first boundary of the first region, wherein the first boundary is located between the first region and the second region;
   the first region is divided into a first sub-region and a second sub-region; and
   when the first initial operation position is located in the first sub-region of the first region, expanding the first region when the first sliding direction corresponds to the first boundary of the first region; and
   reducing the first region when the first sliding direction deviates from the first boundary of the first region;
   when the first initial operation position is located in the second sub-region of the first region, reducing the first region when the first sliding direction corresponds to the first boundary of the first region; and
   expanding the first region when the first sliding direction deviates from the first boundary of the first region, wherein the first sub-region comprises the first boundary and the second sub-region comprises a second boundary opposite to the first boundary.

2. The method according to claim 1, wherein the set of predetermined conditions further comprises: the first sliding direction of the first sliding operation being the same as the second sliding direction of the second sliding operation, and the first sliding operation and the second sliding operation having an overlapped duration.

3. The method according to claim 2, wherein controlling the display size of the first region based on the first sliding direction or the second sliding direction comprises:
   determining a first boundary of the first region, wherein the first boundary is located between the first initial operation position and the second initial operation position; and
   maintaining a second boundary of the first region to be fixed, and controlling the first boundary of the first region to move in the first sliding direction or the second sliding direction, wherein the first boundary is opposite to the second boundary.

4. The method according to claim 3, wherein the first boundary corresponds to an identification region, an area of the first region is larger than an area of the identification region, and the identification region comprises the first boundary; the method further comprises:
   determining that the first initial operation position is located in the first region and the first sliding operation is performed on the first boundary when the first initial operation position is located in the identification region.

5. The method according to claim 3, wherein maintaining the second boundary of the first region to be fixed and controlling the first boundary of the first region to move in the first sliding direction or the second sliding direction comprises:
   controlling the first boundary of the first region to move towards the second boundary to reduce the first region when the first sliding direction or the second sliding direction corresponds to the second boundary; or
   controlling the first boundary of the first region to move in a direction deviating from the second boundary to expand the first region when the first sliding direction or the second sliding direction deviates from the second boundary.

6. The method according to claim 1, wherein controlling the size of the first region based on the first sliding direction or the second sliding direction comprises:
   expanding the first region and reducing the second region, or reducing the first region and expanding the second region, based on the first sliding direction or the second sliding direction.

7. The method according to claim 1, wherein the first region and the second region are adjacent to each other, and the first boundary of the first region contacts or overlaps with a third boundary of the second region, wherein the third boundary of the second region is located between the initial operation position of the first sliding operation and the initial operation position of the second sliding operation; and wherein
   maintaining a second boundary of the first region to be fixed and controlling the first boundary of the first region to move in the first sliding direction or the second sliding direction comprises:
   maintaining the second boundary of the first region and a fourth boundary of the second region to be fixed, wherein the fourth boundary is opposite to the third boundary; and
   controlling the first boundary of the first region and the third boundary of the second region to move in the first sliding direction or the second sliding direction.

8. The method according to claim 1, wherein the first region and the second region are located at two sides of a third region respectively, and the first boundary of the first region and a third boundary of the second region each contact with the third region; and
   the third boundary of the second region is located between the first initial operation position and the second initial operation position; and wherein
   maintaining the second boundary of the first region to be fixed and controlling the first boundary of the first region to move in the first sliding direction or the second sliding direction comprises:
   maintaining the second boundary of the first region and a fourth boundary of the second region to be fixed; and
   controlling the first boundary of the first region and the third boundary of the second region to move in the first sliding direction or the second sliding direction, and maintaining a shape and a size of the third region to be unchanged.

9. An electronic apparatus, comprising:
   one or more processors;
   a memory storing program instructions, that when executed by the one or more processors, configured the electronic apparatus to:
      display a first display page, wherein the first display page comprises a first region and a second region, and an area of the first display page is less than a display area of the electronic apparatus;
      detect a first sliding operation and a second sliding operation with respect to the first display page, wherein the first sliding operation and the second sliding operation are performed simultaneously;
      determine whether the first sliding operation and the second sliding operation satisfy a set of predetermined conditions, wherein the set of predetermined conditions include a first initial operation position of the first sliding operation being located in the first region, a second initial operation position of the second sliding operation being located in a the second region; and
      control a display size of the first region according to a first sliding direction or a second sliding direction when the first sliding operation and the second sliding operation satisfy the set of predetermined conditions,
   wherein the electronic apparatus is configured to control the display size of the first region according to the first sliding direction or the second sliding direction, comprising:
      determining a first boundary of the first region, wherein the first boundary is located between the first region and the second region;
      the first region may be divided into a first sub-region and a second sub-region; and
      when the first initial operation position is located in a first sub-region of the first region, expanding the first region when the first sliding direction corresponds to the first boundary of the first region; and
      reducing the first region when the first sliding direction deviates from the first boundary of the first region; and
      when the first initial operation position is located in the second sub-region of the first region, reducing the first region when the first sliding direction corresponds to the first boundary of the first region; and
      expanding the first region when the first sliding direction deviates from the first boundary of the first region, wherein the first sub-region comprises the first boundary and the second sub-region comprises a second boundary opposite to the first boundary.

10. The apparatus according to claim 9, wherein the set of predetermined conditions further comprises: the first sliding direction of the first sliding operation being the same as a second sliding direction of the second sliding operation, and the first sliding operation and the second sliding operation having an overlapped duration.

11. The apparatus according to claim 10, wherein the electronic apparatus is further configured to:
   determine a first boundary of the first region, wherein the first boundary is located between the first initial operation position and the second initial operation position; and
   maintain a second boundary of the first region to be fixed and control the first boundary of the first region to move in the first sliding direction or the second sliding direction, wherein the first boundary is opposite to the second boundary.

12. The apparatus according to claim 11, wherein the first boundary corresponds to an identification region, an area of the first region is larger than an area of the identification region, and the identification region comprises the first boundary; and wherein the processor is further configured to determine that the first initial operation position is located in the first region and the first sliding operation is performed on the first boundary when the first initial operation position is located in the identification region.

13. The apparatus according to claim 12, wherein the electronic apparatus is further configured to:
   control the first boundary of the first region to move towards the second boundary to reduce the first region when the first sliding direction or the second sliding direction corresponds to the second boundary; or
   control the first boundary of the first region to move in a direction deviating from the second boundary to expand the first region when the first sliding direction or the second sliding direction deviates from the second boundary.

14. The apparatus according to claim 9, wherein the electronic apparatus is further configured to expand the first region and reduce the second region, or reduce the first region and expand the second region based on the first sliding direction or the second sliding direction.

15. The apparatus according to claim 9, wherein the first region and the second region are adjacent to each other, and the first boundary of the first region contacts or overlaps with a third boundary of the second region, wherein the third boundary of the second region is located between the initial operation position of the first sliding operation and the initial operation position of the second sliding operation; and wherein the processor is configured to:
    maintain the second boundary of the first region and a fourth boundary of the second region to be fixed, wherein the fourth boundary is opposite to the third boundary; and
    control the first boundary of the first region and the third boundary of the second region to move in the first sliding direction or the second sliding direction.

16. The apparatus according to claim 9, wherein the first region and the second region are located at two sides of a third region respectively, and the first boundary of the first region and a third boundary of the second region each contact with the third region; and
    the third boundary of the second region is located between the first initial operation position and the second initial operation position; and wherein the processor is configured to:
    maintain the second boundary of the first region and a fourth boundary of the second region to be fixed; and
    control the first boundary of the first region and the third boundary of the second region to move in the first sliding direction or the second sliding direction, and maintain a shape and a size of the third region to be unchanged.

* * * * *